Dec. 23, 1952      W. A. ENDTER      2,622,909
TAKE-UP LATCH MECHANISM
Filed June 6, 1949      4 Sheets-Sheet 1
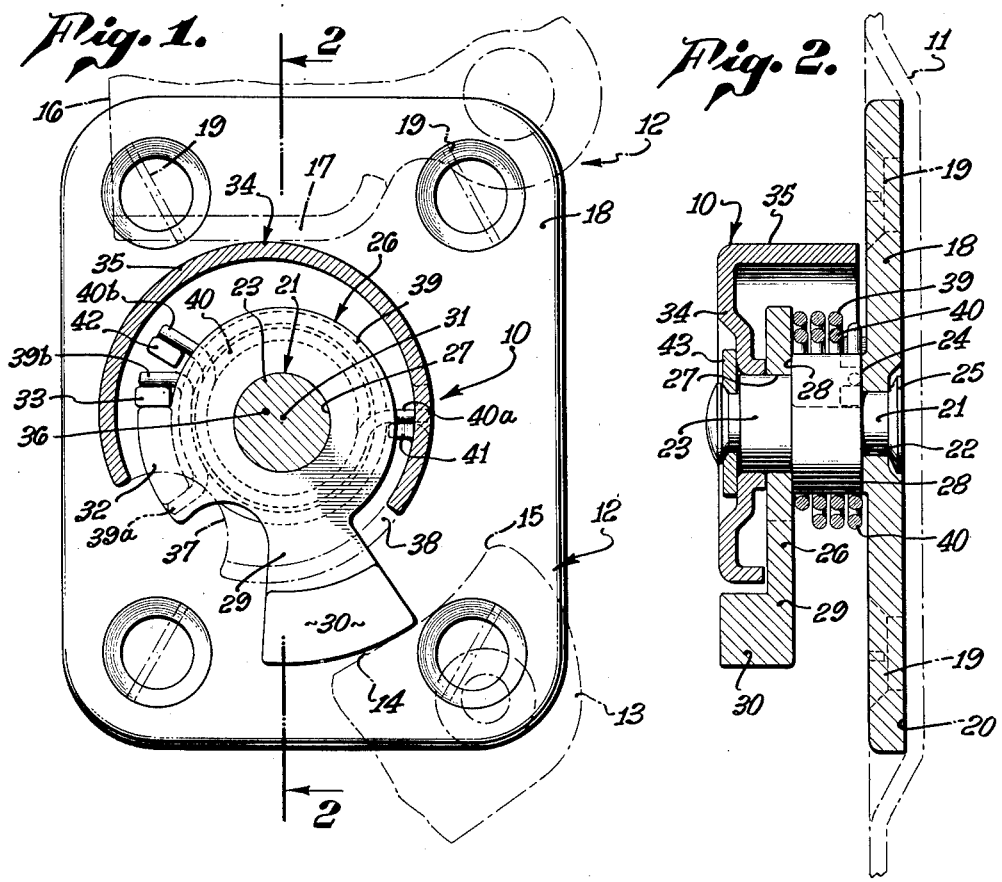
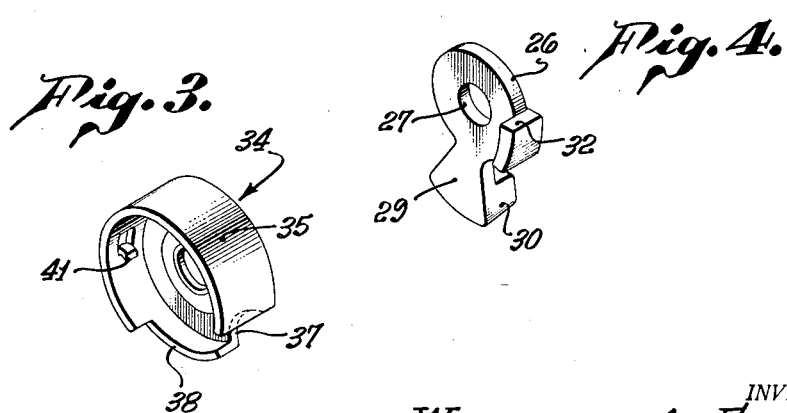
INVENTOR.
WALDEMAR A. ENDTER,
BY
ATTORNEY.

Dec. 23, 1952      W. A. ENDTER      2,622,909
TAKE-UP LATCH MECHANISM
Filed June 6, 1949      4 Sheets-Sheet 2
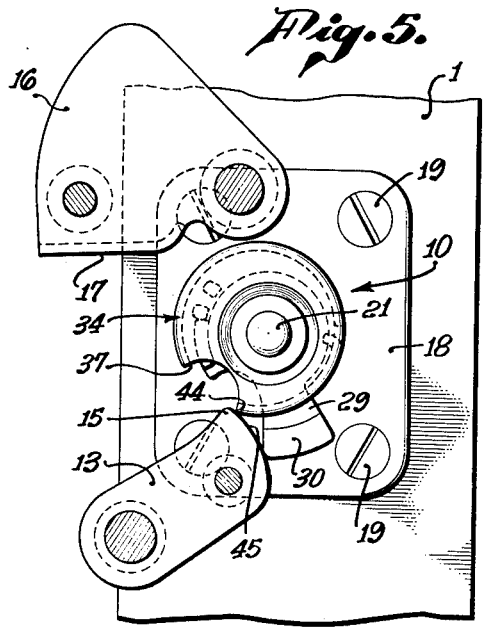
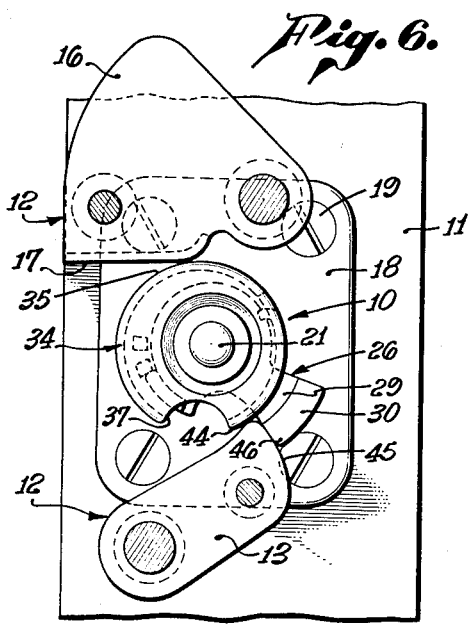
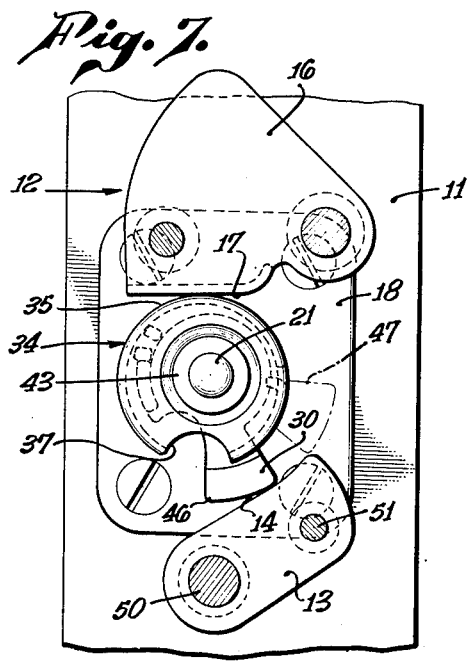
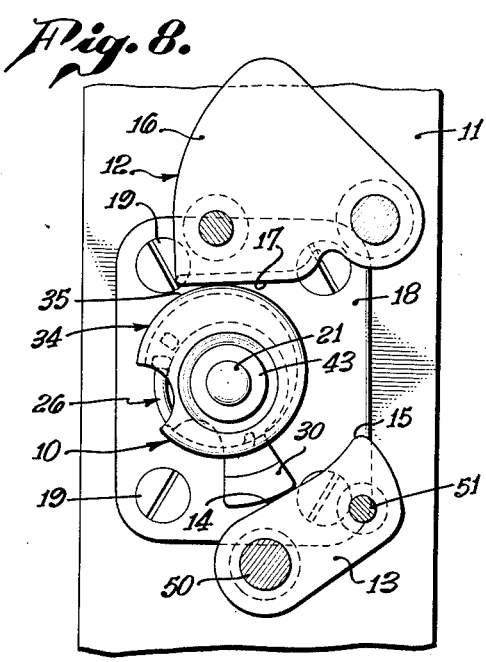
INVENTOR.
WALDEMAR A. ENDTER,
BY H. Calvin White
ATTORNEY.

Dec. 23, 1952 W. A. ENDTER 2,622,909
TAKE-UP LATCH MECHANISM
Filed June 6, 1949 4 Sheets-Sheet 3
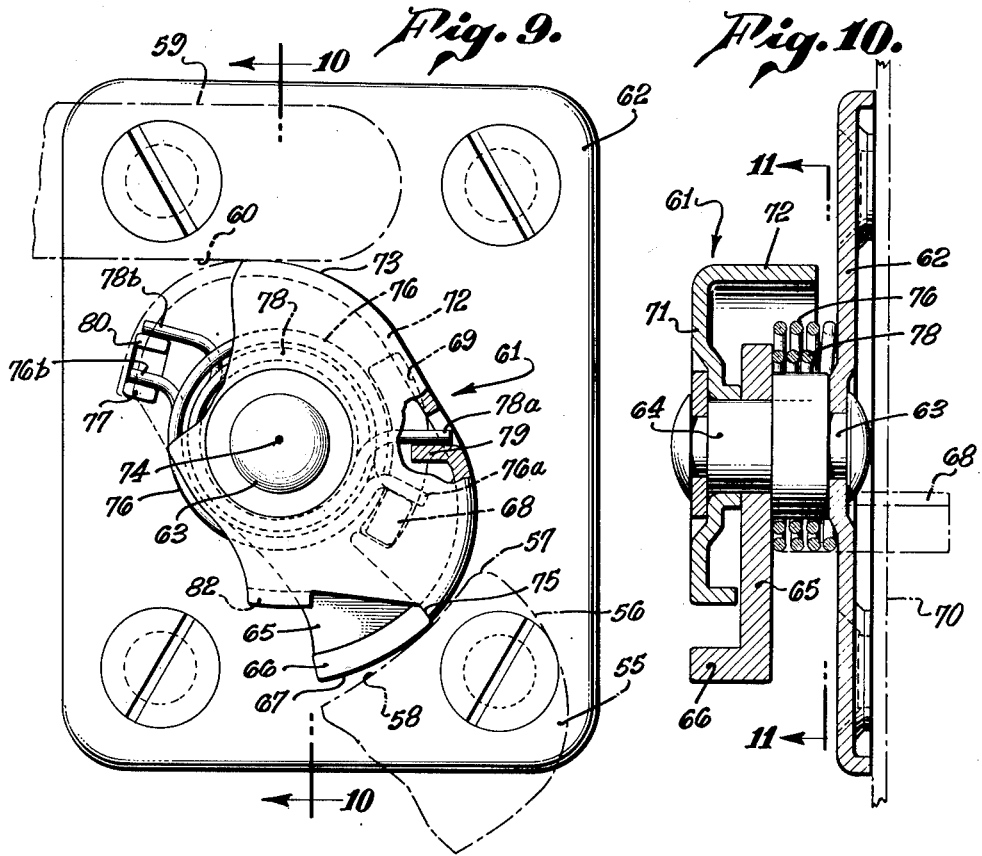
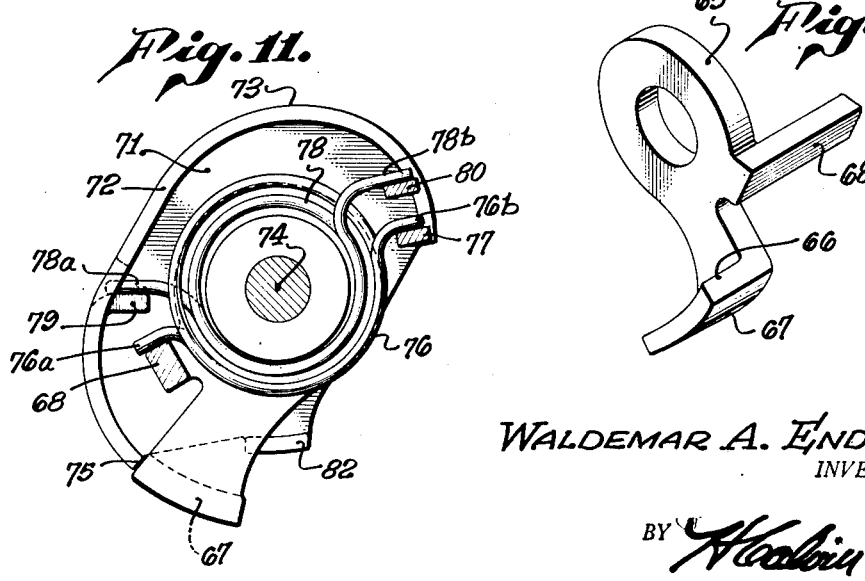
WALDEMAR A. ENDTER,
INVENTOR.
BY
ATTORNEY.

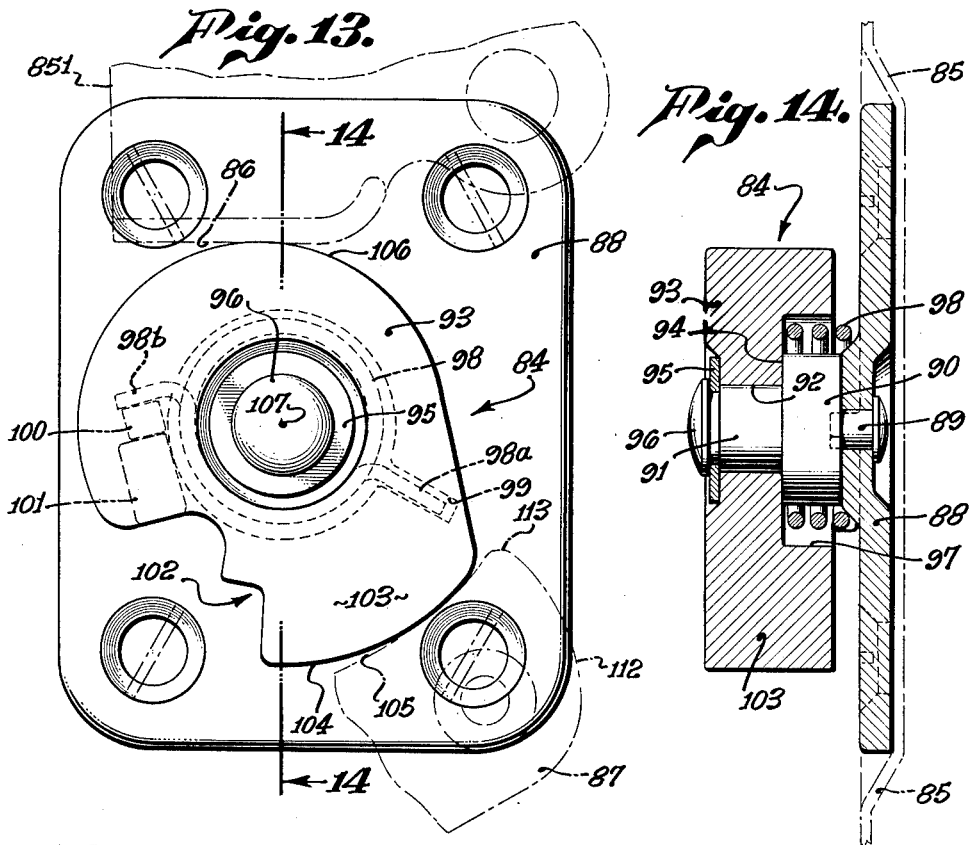
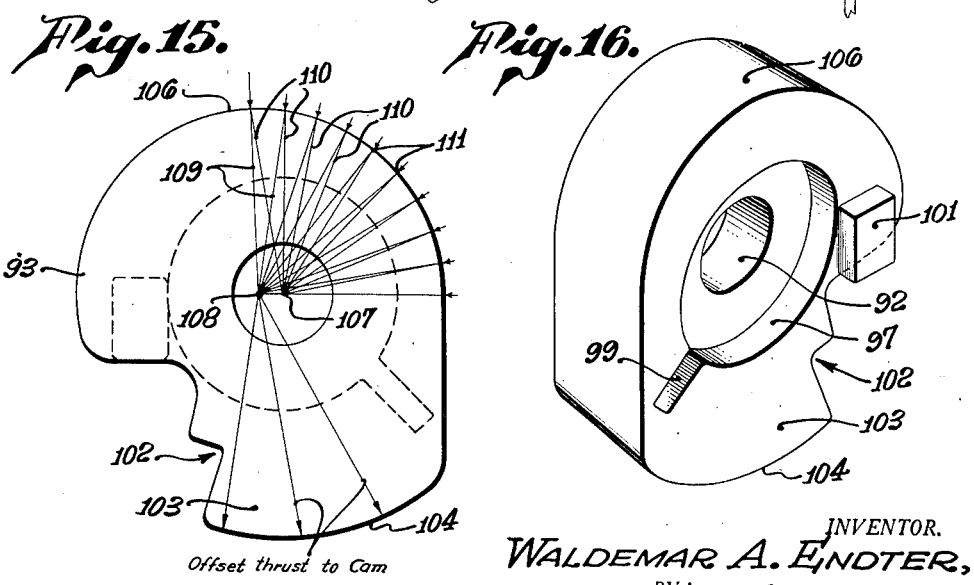

Patented Dec. 23, 1952

2,622,909

UNITED STATES PATENT OFFICE 2,622,909

TAKE-UP LATCH MECHANISM

Waldemar A. Endter, Long Beach, Calif.

Application June 6, 1949, Serial No. 97,498

9 Claims. (Cl. 292—341.13)

This invention has to do with latching mechanisms for releasably securing together two relatively movable parts, particularly the door and frame or pillar parts of an automobile body. More specifically, the invention is directed to improvements in and simplifications of the type of mechanisms disclosed in my copending application Serial Number 94,238 filed May 19, 1949, on Latch Bolt Structure.

Generally speaking, the invention relates to a general keeper and bolt structure employing a pair of spaced keeper parts adapted to receive between them a bolt assembly in a dove-tail relation functionally characterized by its capacity for take-up action. The mechanisms of my named copending application are also so characterized in a general way, but the specific structure therein disclosed is one employing a bolt assembly including the combination of a movable element or housing member, a relatively movable cam and a movable bolt all so assembled and functionally related that actuation of the cam causes the housing element to be pressed against a first of the keeper parts with resultant thrusting of the bolt in a latching and door take-up direction against the other keeper part. In that specific structure, accordingly, the wedging or take-up effect of the cam is transmitted to the first keeper part indirectly and by way of the movable element or housing member.

One of my present major objects is to simplify the structure of the bolt assembly and also to simplify and improve in certain respects its functional relation with the keeper parts. In accordance with the invention, the bolt assembly in its essential aspects is reduced to a bolt portion engageable against one of the keeper parts, and preferably against an inclined or angular surface thereof, and a cam portion presenting a wedging or eccentric surface directly and rotatably engaged against the other keeper part, and urged in a bolt latching and take-up direction.

According to one of its embodiments, the invention has been reduced to the simple combination of a rotatable cam element and a relatively rotatable bolt element, each preferably being independently urged so that retraction of the bolt from the keeper is spring resisted, and the eccentric cam surface of the cam is spring urged against its keeper surface to force the bolt against the bolt engaged keeper part.

Another embodiment of the invention contemplates simplification by incorporating the cam and bolt in a single or unitary element. Here the element has a bolt head rotatably engageable against one (and preferably angular or inclined) keeper surface, and an eccentric surface spring urged directly against the other keeper surface to effect the take-up action referred to above.

All the various features and objects of the invention, as well as the details of certain illustrative embodiments will be clearly understood from the following detailed description of the accompanying drawings, in which:

Fig. 1 is a view showing the bolt and keeper assemblies in latched association, the cam appearing in section;

Fig. 2 is a cross section on line 2—2 of Fig. 1;

Figs. 3 and 4 are views showing the cam and bolt, respectively, in perspective;

Figs. 5 to 8 are views generally similar to Fig. 1 (but with the cam appearing in elevation) showing the successive positions assumed by the bolt assembly as it is ultimately received in full latched condition between the keeper parts;

Fig. 9 is a view similar to Fig. 1 illustrating a variational form of the invention;

Fig. 10 is a cross section on line 10—10 of Fig. 9;

Fig. 11 is a section taken on line 11—11 of Fig. 10;

Fig. 12 is a perspective showing of the bolt contained in the mechanisms of Figs. 9 to 11;

Fig. 13 is a view similar to Fig. 1 showing a further variational embodiment of the invention;

Fig. 14 is a cross section on line 14—14 of Fig. 13;

Fig. 15 is a face view of the combined bolt and cam and including a line layout illustrating the geometry of the cam and bolt surfaces; and Fig. 16 is a perspective view of the bolt and cam unit.

The invention may be considered generally as comprising a bolt assembly generally indicated at 10, adapted to be carried by a member such as a stationary door frame or pillar 11, for latched association with a keeper assembly, generally designated at 12, adapted to be carried by relatively movable member such as a door (not shown), the keeper-carrying edge of which swings into and out of opposed relation to the face of the pillar 11. It is to be understood that the invention contemplates the use of any appropriate keeper structure employing spaced keeper parts having essentially the later described association with the bolt assembly 10. Merely as illustrative, I have shown the keeper assembly 12 as being the type disclosed in my copending application on door latching mechanism, Ser. No. 89,173, filed April 23, 1949, which comprises a lower part 13 presenting an inclined bolt engaging surface 14 together with an upper safety catch nose 15, and a vertically spaced upper keeper part 16, the bottom portion 17 of which presents a bearing shoulder engageable by the cam surface of the bolt assembly, so that the latter is confinable between the keeper parts in a dove-tail relation. Various incidents of the keeper assembly, such as the mounting of its parts for relative movement together to the illustrated bolt confining positions, and their relative movability apart to bolt releasing positions, are developed in detail in the last-mentioned copending application, and need not further be illustrated or discussed for the purposes of the present invention.

The bolt assembly 10 is shown to be carried by base plate 18 secured by screws 19 within recess 20 in the face of the pillar 11. The base plate 18 carries a shaft 21 having an enlarged diameter portion 22 adjacent a reduced but also enlarged diameter intermediate portion 23. As illustrated, portion 22 of the shaft may be securely seated against the base plate at 24 as the inner end of the shaft is headed or upset at 25.

Portion 23 of the shaft carries an oscillatory or rotatable bolt 26 containing a shaft passing opening 27 and engageable against the annular shaft shoulder 28. The bolt has an integral depending head 29, the lower thickened portion of which has an arcurate keeper-engaging face 30, the center curvature of which may be coincident with the axial center 31 of the shaft. The bolt carries an integral lug 32 projecting outwardly of the shaft, the lug being engageable against a stationary stop or support 33 to limit clockwise rotation of the bolt as viewed in Fig. 1.

Portion 23 of the shaft also carries a rotatable cam 34 shaped to provide a curved flange 35 projecting toward the base plate 18 and extending about the bolt and later described springs. Referring to Fig. 1, the flange 35 presents an external cam surface engageable against the keeper shoulder 17, and extending in eccentric relation to the shaft axis 31 so that the cam has in effect progressively increasing radius counter-clockwise of the shaft. Such eccentric relation may be given the shaft and cam flange by forming the latter circularly about the offset center 36. The cam is cut away at 37 to expose the bolt lug 32 and is notched at 38 to pass downwardly projecting head 29 of the bolt.

The bolt is urged in a clockwise or latching direction by an outer coil spring 39 surrounding portion 22 of the shaft, one end 39a of the spring bearing against the lug 32 and the opposite end 39b bearing against the stationary support 33. The cam is urged clockwise and in a direction tending to thrust the bolt against the keeper, by a coil spring 40 accommodated inside spring 39, one end 40a of the cam actuating spring bearing against the cam lug 41, and the opposite end 40b of the spring bearing against the stationary support 42. The bolt and cam assembly is confined between the shaft shoulder 28 and a washer 43 carried at the outer end of the shaft.

In considering the operation of the mechanism, assume first the door carried keeper parts 13 and 16 first to have been swung to the Fig. 5 position where the bolt and cam nose 44 are initially engaged by curved surface 45 of the lower keeper part. Further door-closing advancement of the keeper parts produces counter-clockwise rotation of the cam and bolt against the resistance of springs 39 and 40, until the cam nose 44 overrides the bolt nose 46 whereupon the cam snaps down under the influence of the spring, to the Fig. 6 safety catch position. It will be noted that in this position, the cam flange 35 has been brought into engagement with the upper keeper shoulder 17.

Further movement of the keeper assembly toward the right results in continued counter-clockwise rotation of the bolt to the broken line position 47 of Fig. 7, following which the bolt snaps clockwise down along and against the keeper surface 14 to the solid line position of Fig. 7. Urged by its spring, the bolt moves progressively down the inclined keeper surface as the door is crowded to fully closed position. Coincidentally with and following the bolt rotation, spring 40 acts to rotate the cam in clockwise direction and to thrust its eccentric bearing flange or face 35 against the underside of the keeper shoulder 17. The effect of the cam thus is to progressively press and wedge against the upper keeper and to create between the spaced keeper surfaces 14 and 17 (through the intermediary of the bolt 26) an expansively urged strut effect tending by virtue of the reaction to the bolt thrust against the inclined surface 14 to crowd the door to its full home or closed position. The result is a door take-up action, the range of which may be determined in accordance with such considerations as the radial variance or eccentricity of the cam face 35.

Reference may be had to my copending application Ser. No. 89,173, filed April 23, 1949, concerning the drop down releasability of the lower keeper part 13 to permit the keeper assembly to be withdrawn from the Fig. 8 latched association with the bolt assembly. For present purposes it will suffice to indicate that by swinging the lower pivot part 13 downwardly about its pivot 50 by way of a pivoted control 51, the keeper is permitted to clear the bolt as the door is opened.

Figs. 9 to 12 illustrate a variational form of the invention essentially similar to the described embodiment by differing with respect to the provision of means for manually retracting the bolt from latched association with the keeper, as distinguished from dropping the keeper away from latched association with the bolt. Here the keeper assembly (applicable to either the pillar or door) is designated by the broken lines as comprising a lower keeper part 55 presenting a curved surface 56, nose 57 and inclined bolt-engaged surface 58. The upper and vertically spaced keeper part 59 is in the form of a lug or support, the under surface 60 of which presents a bearing shoulder engageable by the cam section of the bolt assembly 61.

Referring to Fig. 10, the bolt assembly comprises, as before, a base plate 62 (attachable to either the door or pillar) to which is anchored the shaft 63, section 64 of which carries the depending, oscillatory bolt 65, see Fig. 12. The bolt is a one-piece unit including the depending head 66 having the curved keeper-engaging face 67, and an arm 68 projecting through slot 69 in the base plate 62, to a location inside the door or pillar, as the case may be, indicated at 70.

The cam 71 has a peripheral flange 72, the upper surface 73 of which is engageable against the keeper shoulder 60, and which is curved eccentrically about the bolt and shaft axis 74, i. e., surface 73 having progressively increasing radius in a counter-clockwise direction about the axis 74. Thus upon clockwise rotation against the shoulder 60, the cam thrusts the bolt face 67 with increasing force against the inclined keeper face 58. The cam 71 in this instance is elongated to extend downwardly a distance such that the flange 72 is terminally engageable at 75 by the bolt head 66.

The bolt is urged in a clockwise or latching direction by the shaft encircling coil spring 76, one end 76a of which bears against the arm 68, the opposite end 76b bearing against the stationary support 77. The cam is urged for clockwise rotation to thrust the bolt in a latching direction, by a coil spring 78 contained within spring 76 and having one end 78a engaged against the inwardly struck cam lug 79, see Fig. 11, the opposite end 78b bearing against the stationary support 80.

The operation of the assembly shown in Figs. 9 to 11 will be readily understood from the preceding description of Figs. 5 to 8. Briefly, and assuming the bolt assembly 61 to be carried by a door, closing movement of the door from open position first brings cam lug 82 and the bolt head 66 into engagement with the curved keeper surface 56. Upon further closing advancement of the door, the cam lug 82 overrides the keeper nose 57, and the cam then snaps down under the influence of spring 78 to establish lug 82 in the safety catch position. As the door continues to close, the bolt head 66 is displaced counter-clockwise, carrying with it the cam 71, until the bolt overrides the cam nose 57, and snaps down to a position of engagement with the inclined keeper surface 58, as shown in Fig. 9. Final latching rotation of the bolt is followed by rotation of the cam under the influence of spring 78 which produces a wedging rotation of the cam surface 73 against the keeper bolt 60, with resultant transmittal of thrust by way of the bolt against the keeper surface 58 to produce a final door crowding or take-up action, all as previously explained with relation to the first described embodiment. The bolt may be released from latched association with the keeper 55, and to permit retraction of the assembly 61 from between the keepers 55 and 69, by any suitable kind of roll-back or manually controlled operators (not shown) engageable or connectible with the arm 68 and acting to rotate the bolt (and with it the cam), in a counter-clockwise direction, as viewed in Fig. 9 to the point at which the bolt head will clear the keeper nose 57.

The third form of the invention illustrated in Figs. 13 to 16 differs from the forms described above, essentially in that the bolt and cam are formed as a unit or one-piece element. Merely as illustrative, the bolt assembly, generally indicated at 84, may be assumed, as in the case of the first described embodiment of the invention, to be carried by the door pillar 85 and to be receivable between door-carried keeper parts comprising the upper keeper section 85l presenting an under surface or bearing shoulder 86, and a lower drop-down section 87 corresponding to the first described keeper part 13.

Referring to Figs. 14 and 16, the base plate 88 carries a shaft 89 having an enlarged portion 90 and a second intermediate enlargement 91 extending through opening 92 in the bolt and cam element 93, the latter thus being rotatable on the shaft. Element 93 is confined between the shaft shoulder 94 and a washer 95 fixed in place by the shaft head or upset 96. Recess 97 within the unit 93 contains the shaft-encircling coil spring 98, one end 98a of which engages against shoulder 99 on the unit, the opposite end 98b of the spring bearing against the stationary support 100. In the unlatched condition of the parts, clockwise rotation of the bolt under the influence of the spring, is limited by the engagement of lug 101 against the support 100. The bolt is notched at 102 to provide a safety catch recess for reception of the keeper nose 113. As illustrated, the lower or head portion 103 of the element has a curved face 104 received in latched condition against the inclined surface 105.

The element 93 has an upper cam surface 106 curved in eccentric relation to the shaft axis 107, the surface 106 curving at increasing radii in a counterclockwise direction, so that upon clockwise rotation of the element 93, surface 106 exerts a progressive wedging or camming thrust against the keeper shoulder 86. As illustrative of a cam profile shaped to minimize any tendency for inadvertent antilatching rotation of the element from latched position, or for insuring against such rotation, the curvature of the surface 106 may be derived as illustrated in Fig. 15. The cam surface has an offset center of curvature 108 so related to the shaft axis 107 that lines 109 radial to the center 108 and the lines 110 radial to the center 107 intersect at the points 111 to establish the cam profile, the intersecting pairs of radii 109 and 110 forming respectively, substantially the indicated angles ranged from 0° to 7°30''. At the points 111 of intersection, tangents to the curvature of surface 106 are substantially normal or at right angles to the radial lines 109.

As the keeper assembly is advanced against the cam and bolt element 93, the latter is displaced counterclockwise by engagement with the keeper surface 112 until the element snaps into the safety catch position, following which the element overrides the keeper nose 103 and is rotated by spring 98 into latched and progressively advancing engagement with the keeper surface 105. The same rotation of the element, and consequent camming engagement of surface 106 against the keeper shoulder 86 thrusts the element against the lower keeper to effect the above described take-up action.

I claim:

1. In a latch mechanism, the combination comprising a rotable bolt assembly having a lower keeper contacting face, spaced upper and lower keeper parts adapted to receive between them and retain said bolt assembly in dove-tail relation, the lower keeper part having an inclined surface downwardly along which said contacting face of the bolt assembly is movable in effecting progressive take-up relative movement of the bolt and keeper parts, a shaft about which said bolt assembly is rotatable, a spring urging said contacting face downwardly along said lower keeper surface, said bolt assembly having a curved cam bearing face which rotates against said upper keeper part during said movement of said contacting face downwardly along said lower keeper surface and the radial dimensions of said bearing face from the axial center of said shaft increasing in an angular direction opposite the direction of said rotation of said bearing face against said upper keeper part, whereby rotation of said bearing face against the upper keeper part exerts a take-up thrust of the bolt assembly against the inclined lower keeper surface.

2. In a latch mechanism, the combination comprising a rotatable bolt assembly having a lower keeper contacting face, spaced upper and lower keeper parts adapted to receive between them and retain said bolt assembly in dove-tail relation, the lower keeper part having an inclined surface downwardly along which said contacting face of the bolt assembly is movable in effecting progressive take-up relative movement of the bolt and keeper parts, a shaft about which said bolt assembly is rotatable, a coil spring surrounding the shaft and overlapped longitudinally thereof by said bolt assembly, the spring engaging the bolt assembly to urge said contacting face downwardly along said lower keeper surface, said bolt assembly having a curved cam bearing face which rotates against said upper keeper part during said movement of said contacting face downwardly along said lower keeper surface and the radial dimensions of said bearing face from the axial center of said shaft increasing in an angular direction opposite the direction of said rotation of said bearing face against said upper keeper part, whereby rotation of said bearing face against the upper keeper part exerts a take-up thrust of the bolt assembly against the inclined lower keeper surface.

3. In a latch mechanism, the combination comprising a rotatable single piece bolt having a lower keeper contacting face and an upper curved cam bearing face, spaced upper and lower keeper parts adapted to receive between them and retain said bolt in dove-tail relation, the lower keeper part having an inclined surface downwardly along which said contacting face of the bolt is movable in effecting progressive take-up relative movement of the bolt and keeper parts, a shaft extending through the bolt and about which the bolt is rotatable, a spring engaging the bolt to urge said contacting face downwardly along said lower keeper surface, the radial dimensions of said curved cam bearing face of the bolt from the axial center of the shaft increasing in an angular direction opposite the direction of said cam bearing face rotation during said movement of said contacting face of the bolt along said lower keeper part surface, whereby rotation of said bearing face against said upper keeper part exerts a take-up thrust of said bolt assembly against said inclined lower keeper surface.

4. In a latch mechanism, the combination comprising a rotatable bolt assembly comprising relatively rotatable sections, one of said sections having an upper curved cam bearing face and the other section having a lower keeper contacting face, spaced upper and lower keeper parts adapted to receive between them said bolt assembly in dove-tail relation, the lower keeper part having an inclined surface downwardly along which said contacting face of the bolt assembly is movable in effecting progressive take-up relative movement of the bolt and keeper parts, a shaft about which said bolt assembly is rotatable and said sections are relatively rotatable, a spring urging said contacting face downwardly along said lower keeper surface, the radial dimensions of said curved cam bearing face of the bolt assembly from the axial center of the shaft increasing in an angular direction opposite the direction of the cam bearing face rotation during said movement of said contacting face of the bolt assembly along the lower keeper part surface, whereby rotation of said bearing face against the upper keeper part exerts a take-up thrust of the bolt assembly against the inclined lower keeper surface.

5. In a latch mechanism, the combination comprising a rotatable bolt assembly comprising relatively rotatable sections, one of said sections having an upper curved cam bearing face and the other section having a lower keeper contacting face spaced upper and lower keeper parts adapted to receive between them said bolt assembly in dove-tail relation, the lower keeper part having an inclined surface downwardly along which said contacting face of the bolt assembly is movable in effecting progressive take-up relative movement of the bolt and keeper parts, a shaft about which said bolt assembly is rotatable and said sections are relatively rotatable, a coil spring surrounding the shaft and engaging one of said bolt assembly sections to urge said contacting face downwardly along said lower keeper surface, a second spring surrounding the shaft and resisting relative rotation of said sections, the radial dimensions of said curved cam bearing face of the bolt assembly from the axial center of the shaft increasing in an angular direction opposite the direction of the cam bearing face rotation during said movement of said contacting face of the bolt assembly along the lower keeper part surface, whereby rotation of said bearing face against the upper keeper part exerts a take-up thrust of the bolt assembly against the inclined lower keeper surface.

6. In a latching mechanism, the combination comprising: a rotatably mounted bolt assembly having a latching portion provided with a keeper-contacting latch face and a camming portion provided with a curved keeper-contacting cam face peripherally spaced from said latch face; spaced upper and lower keeper parts for reception and retention of said bolt assembly in dove-tail relation therebetween, one keeper part having an inclined surface along which said latch face moves in effecting progressive take-up relative movement of said bolt assembly and said keeper parts and the other keeper part having a surface extending parallel to the direction of said relative take-up movement and against which said cam face rotates during latching movement of said assembly, said cam face being of progressively increasing radius in an angular direction opposite that of its said rotation against said other keeper part; and spring means urging said latching portion to rotate in a latching direction and said camming portion in a camming direction, whereby rotation of said cam face against said other keeper part exerts a take-up thrust of said latching portion against said inclined surface of said one keeper part.

7. The structure defined in claim 6 in which said latching and camming bolt assembly portions are separate parts both mounted for rotation on a single shaft, said camming portion partially enclosing said latching portion.

8. The structure defined in claim 7 in which the spring means is two coil springs coaxially surrounding the shaft within the camming portion.

9. The structure defined in claim 6 in which the latching and camming bolt assembly portions are formed on a one-piece member.

WALDEMAR A. ENDTER.

REFERENCES CITED

The following references are of record in the file of this patent:

UNITED STATES PATENTS

| Number | Name | Date |
|---|---|---|
| 1,639,862 | Shilling et al. | Aug. 23, 1927 |
| 2,156,874 | Schonitzer | May 2, 1939 |
| 2,264,772 | Rightmyer | Dec. 2, 1941 |

FOREIGN PATENTS

| Number | Country | Date |
|---|---|---|
| 810,192 | France | Dec. 19, 1936 |
| 846,993 | France | June 19, 1939 |